(12) United States Patent
Mönch

(10) Patent No.: US 6,240,092 B1
(45) Date of Patent: May 29, 2001

(54) DECENTRALIZED RADIOCOMMUNICATIONS SYSTEM AND RADIO STATION THEREFOR

(75) Inventor: Egon Mönch, Remchingen (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/062,088

(22) Filed: Apr. 17, 1998

(30) Foreign Application Priority Data

Apr. 18, 1997 (DE) .............................................. 197 16 432

(51) Int. Cl.⁷ ...................................................... H04L 12/28
(52) U.S. Cl. ............................ 370/408; 370/431; 370/447
(58) Field of Search ..................................... 370/221, 222, 370/255, 258, 225, 227, 328, 329, 341, 408, 432, 447, 461, 462; 455/445, 500, 550

(56) References Cited

U.S. PATENT DOCUMENTS 5,640,384  * 6/1997 Du ......................................... 370/221
6,122,250  * 9/2000 Taniguchi .............................. 370/222

FOREIGN PATENT DOCUMENTS 3503308    8/1985 (DE) .
3908940    9/1990 (DE) .
3918697   12/1990 (DE) .
4335265    4/1994 (DE) .
19518754  12/1995 (DE) .

* cited by examiner

*Primary Examiner*—Wellington Chin
*Assistant Examiner*—Brenda Pham

(57) ABSTRACT

In the radiocommunications system according to the invention, all stations (N1 to N7) transmit radio signals with respective identifications (I1 to I7) assigned to them. Each station (N3) has a memory which holds a first list (LA3) with those identifications (I2; I4) which this station (N3) receives directly from the at least one neighboring station (N2; N4), and a second list (LB3) with those identifications (I3, I1; I3, I5) which the at least one neighboring station (N2; N4) receives directly from its neighboring stations (N3, N1; N3, N5) and routes to said station (N3).

The stations therefore need not each contain a scanning receiver in order to avoid simultaneous use of the same frequencies used by neighboring stations for transmission purposes.

The stations are therefore simple in construction. The radiocommunications system can also be a single-frequency system.

10 Claims, 3 Drawing Sheets

LA3

| S | R |
|---|---|
| I2 | I3 |
| I4 | I3 |
| | |

LB3

| S | R |
|---|---|
| I3 | I4 |
| I6 | I7 |
| I4 | I5 |
| I2 | I1 |
| I5 | I6 |
| I3 | I2 |
| I7 | I5 |
| I5 | I4 |
| I1 | I2 |
| I7 | I6 |
| | |

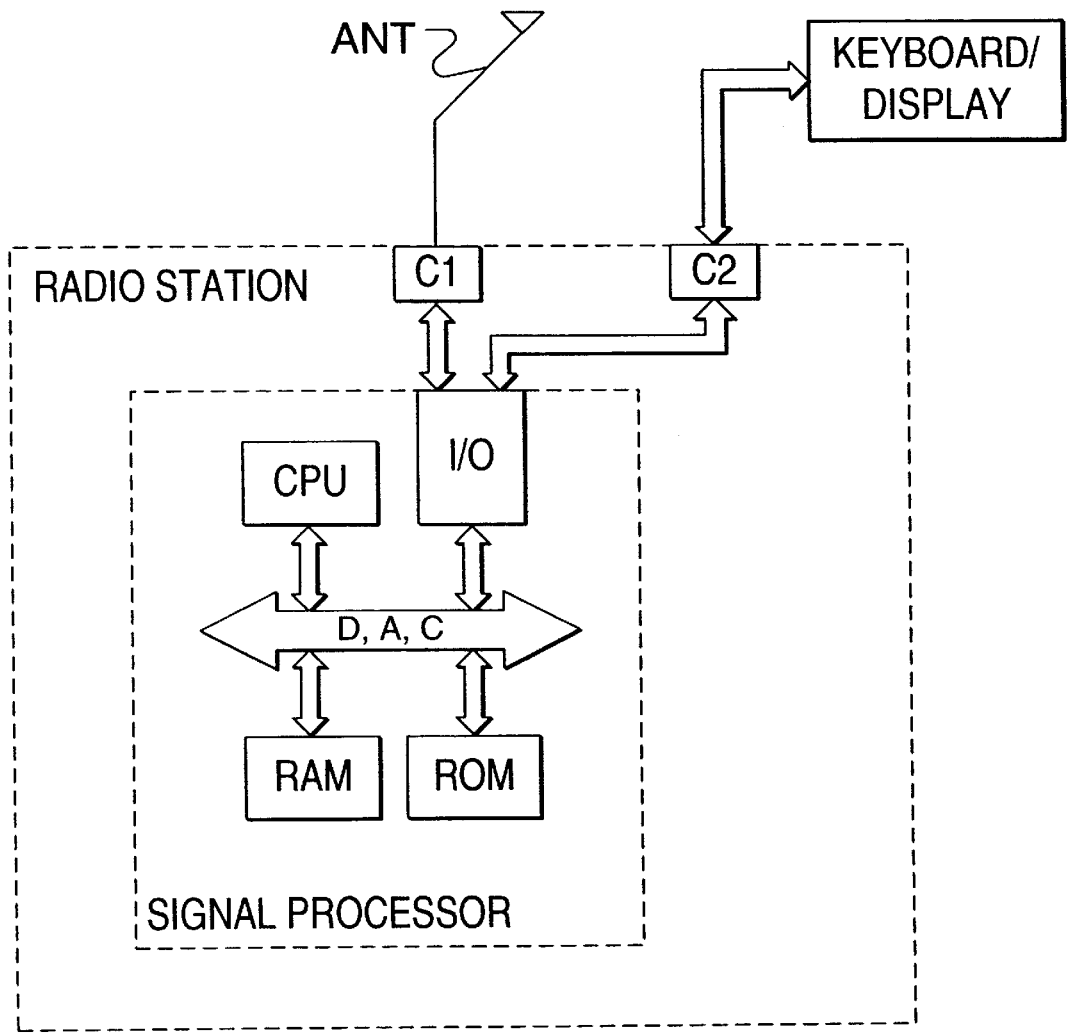
_FIG. 4_

DECENTRALIZED RADIOCOMMUNICATIONS SYSTEM AND RADIO STATION THEREFOR

BACKGROUND OF THE INVENTION

1. Technical Field

This invention relates to a decentralized radiocommunications system as set forth in the preamble of claim 1 and to a radio station therefor.

2. Discussion of Related Art

DE 39 08 940 A1 discloses a decentralized radiocommunications systems with a number of radio stations. Each of the radio stations has at least one neighboring radio station with which it is in direct radio communication. The prior-art radiocommunications system makes available several pairs of channels for duplex transmission between the radio stations. To ensure reliable radiocommunication, prior to the establishment of a radio link, each radio station checks all channels to determine whether they are free, and creates a so-called channel occupancy list. Then, a radio link is established to a neighboring radio station on a free channel. If the neighboring radio station is not a destination station but is to serve as a relay station, it will evaluate its channel occupancy list to establish a radio link to a further radio station. This makes it possible to establish so-called radio chains. In the radiocommunications system described in DE 39 08 940 A1, however, each radio station must check all channels prior to the establishment of a radio link, i.e., each station must include a scanning receiver. In addition, a radio chain can be established in the prior-art radiocommunications system only if a free pair of channels is found for each of the radio links, i.e., if several radio frequencies are available.

SUMMARY OF THE INVENTION

It is an object of the invention to provide a radiocommunications system having radio stations of simple construction. The establishment of radio links is to be independent of whether the radiocommunications system is a multifrequency system or a single-frequency system.

In accord with a first aspect of the invention, a decentralized radiocommunications system comprising a number of radio stations (N1 to N7), each radio station (N3) having at least one neighboring radio station (N2; N4) with which it is in direct radio communication, characterized in that all radio stations (N1 to N7) transmit radio signals with respective identifications (I1 to I7) assigned to them, and that each radio station (N3) includes a memory which holds a first list (LA3) with identifications (I2, I4) which said radio station (N3) receives directly from the at least one neighboring radio station (N2; N4), and a second list (LB3) with identifications (I3, I1; I3, I5) which the at least one neighboring radio station (N2; N4) receives directly from radio stations (N3, N1; N3, N5) neighboring said at least one neighboring radio station and routes to said radio station (N3).

According to a second aspect of the invention, a decentralized radiocommunications system as claimed in claim 1, characterized in that the second list (LB3) also contains identifications (I2, I4, I5, I6, I7) which other radio stations (N1, N5, N6, N7) receive and route via the at least one neighboring radio station (N2; N4) to said radio station (N3).

According to the invention, each radio station transmits radio signals with an identification assigned to it and includes a memory which holds a first list with those identifications which said radio station receives directly from the at least one neighboring radio station, and a second list with those identifications which the at least one neighboring radio station receives directly from its neighboring radio stations and routes to said radio station.

In this manner, current lists are stored in each radio station which indicate to which neighboring radio stations a direct radio link can be established and to which other radio stations an indirect radio link can be established. Since identifications are registered and stored, no channel-scanning receivers are necessary. The radiocommunications system can also be a single-frequency system.

These and other objects, features and advantages of the present invention will become more apparent in light of the following detailed description of a best mode embodiment thereof, as illustrated in the accompanying drawing.

BRIEF DESCRIPTION OF THE DRAWING

FIG. 4 shows a radio station according to the invention.

DETAILED DESCRIPTION OF PREFERRED EMBODIMENTS

Figures 1, 2:
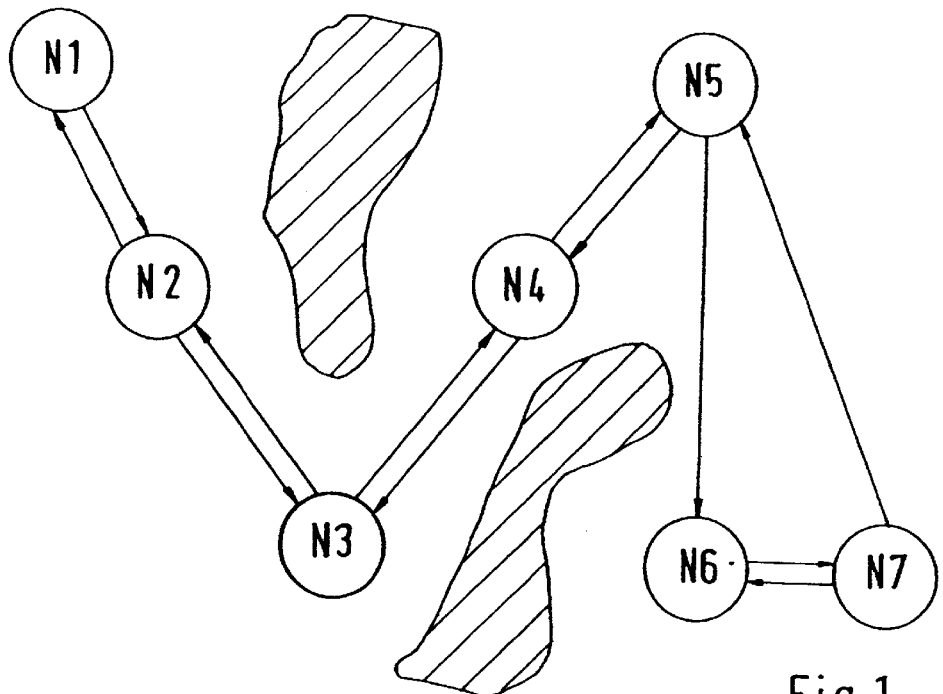
FIG. 1 shows schematically a radiocommunications system with a number of radio stations.
FIG. 2 shows schematically the contents of the stored lists for a radio station.

FIG. 1 schematically shows a radiocommunications system with seven radio stations N1 to N7. The radio stations are mobile stations which can move freely in an area. Accordingly, the radio propagation conditions change continuously in the radiocommunications system, so that not all of the radio stations can communicate with one another directly at any time. FIG. 1 illustrates a receiving situation in which the radio stations N1 to N7 can communicate with one another as follows:

A direct radio link in the transmit and receive directions (duplex link) exists between the radio stations N1 and N2, N2 and N3, N3 and N4, N4 and N5, and N6 and N7. In addition, one-way radio links exist between N5 and N6, with only N6 capable of receiving from N5, and between N5 and N7, with only N5 capable of receiving from N7. The reasons why not each of the stations is in direct radio communication with any other station are essentially as follows: firstly, shadow loss caused by fixed or moving obstructions (shown hatched in FIG. 1); secondly, the changing nature of the wave path; thirdly, faults occurring in the transmitter or receiver section, so that only one-way radio communication is possible.

In the receiving situation shown in FIG. 1, station N2, for example, cannot enter into direct radio communication with station N5 but must establish a radio link via the other stations N3 and N4, which act as relay stations. For a radio transmission between station N4 and station N7, the situation as shown in FIG. 1 is as follows: Radio signals to be sent from N4 to N7 must be routed via stations N5 and N6. Radio signals to be sent in the opposite direction, from station N7 to station N4 must only be routed via station N5.

As FIG. 1 shows by way of example, the situation may be very complex. The radio signals must be routed via one or more radio stations in order to finally arrive at the destination station. To ensure that radio communication and this routing can be carried out in a reliable manner, the radiocommunications systems according to the invention and the stations for this system have the following features, which will be described in reference to the situation for station N3.

Station N3, like each of the other stations, transmits radio signals with an identification assigned to it. Furthermore, station N3, like each of the other stations, has a memory in which a first list and a second list (FIG. 2) are stored.

As shown in FIG. 4, the stations may each include a signal processor including a microprocessor (CPU) with which to store and retrieve identifications to and from said lists. Each radio station will also have at least one antenna (ANT) for communicating with other stations. The antenna is connected to the signal processor via a connection C1, which is in turn connected to an Input/Output part of the signal processor and to a data, address and control bus (D, A, C). The memory may include both volatile (RAM) and non-volatile (ROM) memory as known in the art. For example, the RAM of FIG. 4 may be used to store the lists of FIG. 2. The radio station may also include an operator interface such as a keyboard and display or the like, which may be connected to the signal processor as shown through a connection C2. The operator interface and/or antenna can also be inside the radio station.

Like station N3, each of the other stations transmits radio signals with an identification assigned to it and with identifications from a first list and a second list. Also, each of the other stations includes a memory which holds a first list with those identifications which this station receives directly from the at least one neighboring station, and a second list with those identifications which all other stations receive directly from their respective neighboring stations. With each data packet, an identification from the first list and an identification from the second list is routed onward. With the identification which is assigned to the sending station, a first list is updated in the receiving station. With the identifications taken by the sending station from its first list and its second list, a second list is updated in the receiving station. The lists are created automatically upon turn-on and are shown completely in FIG. 2 for the receiving situation of FIG. 1.

For station N3, this means:

The first list LA3 stored in the memory contains first identifications which station N3 receives directly from its neighboring stations N2 and N4, namely the identifications I2 and I4, respectively. These first identifications I2 and I4 are entered in a first column S of the first list LA3. Accordingly, the first column S contains those identifications which were transmitted by neighboring stations. A second column R of the first list LA3 contains the identifications of those stations which received the identifications I2 and I4 from stations N2 and N4, respectively. In this case, the second column R contains the identification for station N3, of course. The first list LA3 thus indicates that station N3 is receiving radio signals directly from the neighboring stations N2 and N4.

The second list LB3 contains the identifications which are received by the neighboring stations N2 and N4. It also has a first column S, which contains the identifications of the sending stations, and a second column R, which contains the identifications of the receiving stations. In the example shown in FIG. 2, in the first row of list LB3, the identification I3 has been entered in column S, and the identification I4 in column R. This row thus indicates that station N4 (R=I4) has received a radio signal directly from station N3 (S=I3). In another row of list LB3, the identifications S=I5 and R=I4 are given. Accordingly, station N4 has received a radio signal directly from station N5. In another row, S=I3 and R=I2.

Accordingly, station N2 receives radio signals directly from station N3. In a further row of the second list LB3, S=I1 and R=I2. Accordingly, station N2 receives radio signals directly from station N1. The second list LB3 thus contains the identifications I1, I3 and I3, I5 received by all neighboring stations N2 and N4, respectively.

The second list LB3 further contains information on the other stations N1, N5, N6, and N7. In one row of the list it is indicated that station N1 receives radio signals directly from station N2 (S=I2 and R=I1). For station N5 it is indicated that this station receives directly from N4 or N7 (S=I4 and R=I5; S=I7 and R=I5). A further row indicates that N6 receives directly from N5 or N7 (S=I5 and R=I6; S=I7 and R=I6), and that N7 receives directly from N6 only (S=I6 and R=I7).

By storing the lists LA3 and LB3 shown in FIG. 2, station N3 has connection data which indicate to which neighboring stations N2 and N4 a direct radio link can be established and to which non neighboring stations N1, N5, N6, and N7 an indirect radio link can be established. The other stations of the radiocommunications system have corresponding lists, so that radio signals can be quickly and easily routed within the radiocommunications system.

The following describes in more detail with the aid of FIG. 3 how the stored lists are created. The method is identical in each station, so that it can be applied to a decentralized wireless LAN (local area network).

Figure 3A:
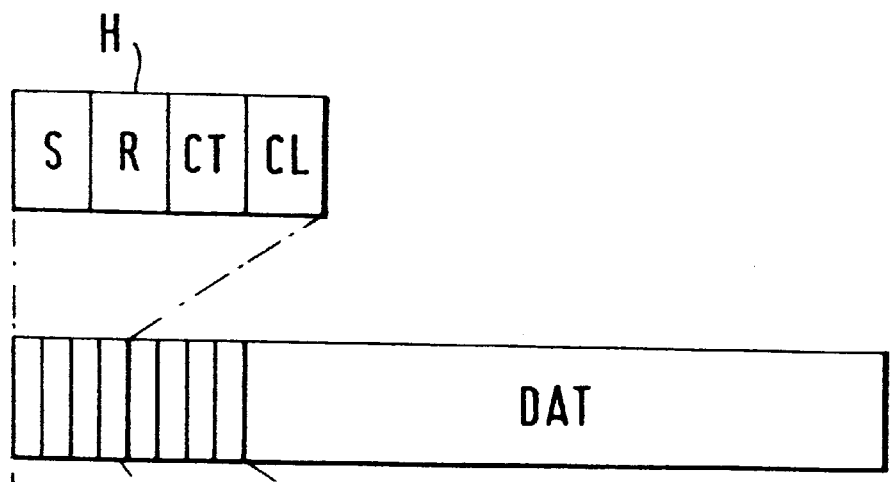
FIG. 3 shows schematically the structure of data packets which are transmitted by the radio station.
Figure 3B:
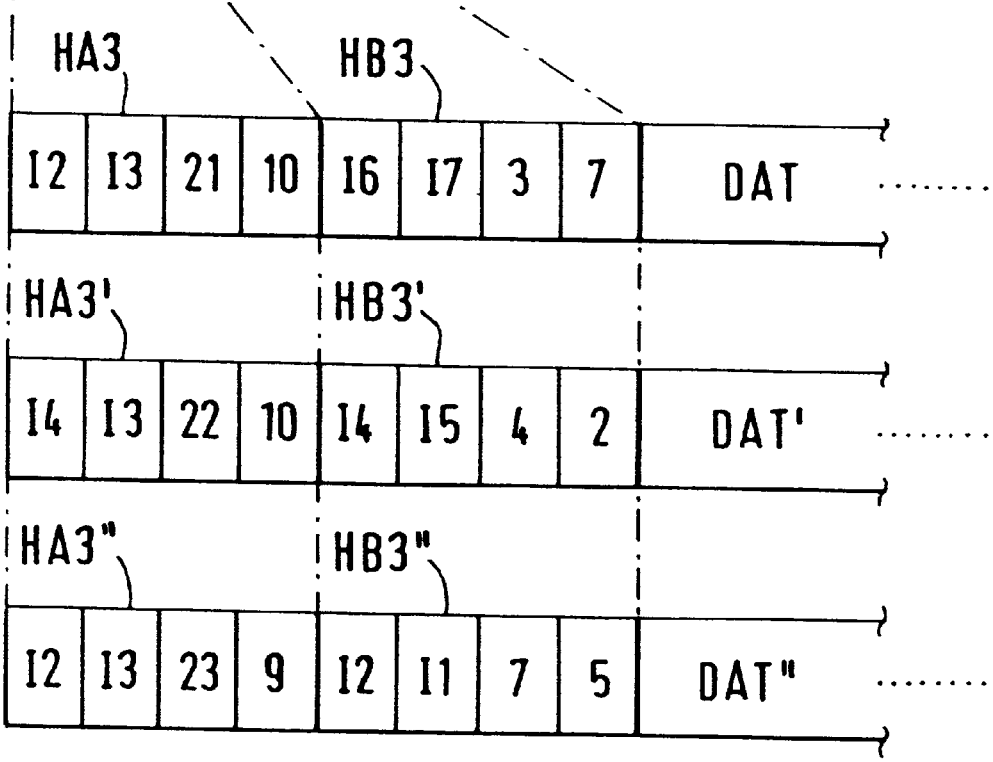

The radiocommunications system described is a digital system in which data packets are transmitted. FIG. 3a schematically shows the structure of such a data packet DAT. Each packet begins with two data fields H, hereinafter also referred to as "headers". If no packets with data have to be transmitted, empty packets with the headers are transmitted at sufficient time intervals so that the two lists (see FIG. 2, LA3 and LB3) can be continuously updated. The first data field contains information from the first list, and the second data field contains information from the second list. FIG. 3b shows three data packets which are transmitted by station N3 one after the other, namely the packets DAT, DAT', and DAT". Each of the packets has a first data field HA3, HA3', HA32" and a second data field HB3, HB3', and HB3". Each first data field contains information from the first list (see FIG. 2, LA3), and each second data field contains information from the second list (see FIG. 2, LB3).

With each transfer of the information from the lists into the headers, the information from the respective next rows of the lists is transferred, so that the transfers occur periodically. Each data field is subdivided into four subfields, namely a first subfield S, a second subfield R, a third subfield CT, and a fourth subfield CL. The subfields CT and CL are also contained in the lists LA3, LB3 of FIG. 2; they are not shown there for the sake of clarity. The first subfield S contains the identification of a sending station, and the second subfield R contains the identification of a station which receives the transmitted identification. These subfields S and R have entries which correspond to the entiries in columns S and R of the lists of FIG. 2. The third subfield CT contains a time stamp, and the fourth subfield CL contains a count. The entries in the subfields will now be explained in more detail with the aid of the example of FIG. 3b:

Let us assume that station N3 received the identification I2 from neighboring station N2. The identification I2 was stored in column S of the first list LA3. This information S=I2 and R=I3 now is to be sent to other stations.

In addition, station N3 had earlier received, via neighboring station N4, a radio signal which contained the identifications S=I6 and R=I7. These identifications were entered in subfields of the data field (header) of the radio signal. Accordingly, station N7 (R=I7) can be received directly by station N6 (S=I6). This information S=I6 and R=I7 was stored in the second list LB3 of station N3 and now is to routed to other stations.

Before sending the data packet DAT, station N3, by accessing the first list LA3, forms the first data field HA3 with the following entries: S=I2, R=I3, CT=21, and CL=10. During the creation or replacement of the entry in the first list, the count CL was set at a maximum value (for example 10).

During the access to the first list, the count CL is decremented by one for the next access. When the counter has reached a lower limit, the entry in the first list is deleted.

Thus, the first data field HA3 provides the following information: Station N3 can receive directly from station N2 (S=I2 and R=I3). The information has the time stamp CT=21 and the count CL=10. The time stamp CT corresponds to the current system time and indicates at what time the data field HA3 was created. Consequently, the time stamp CT indicates how old the data field is, and the count CL indicates how often the data field has already been routed onward.

Both the time stamp and the count are criteria of the dwell time of a data field in the radiocommunications system. Based on these criteria, an "obsolete" data field can be removed before or after the radio transmission when the count has reached a lower limit. Or it can be replaced after the radio transmission by a "more recent" data field if the time stamp is more up to date.

In addition to the first data field, station N3, by accessing the second list LB3, forms the second data field HB3 with the following entries: S=I6, R=I7, CT=3, and CL=7. For the next access, the count CL in the second list is decremented by 1. When the count has reached a lower limit, the entry in the second list is deleted. The data field HB3 contains the following information: Station N7 has received a radio signal directly from station N6. The data field HB3 was created by station N7 at the time CT=3. This system time is retained when the information is routed onward. The information that station N7 receives directly from station N6 (S=I6 and R=I7) has already been routed onward within the radiocommunications network three times (3=10−CL=10−7). By sending this data packet DAT with the associated data fields HA3 and HB3, the abovementioned information is communicated to the stations adjacent to station N3, i.e., to stations N2 and N4.

Station N2, for example, gets the information from the first data field HA3 that station N3 can receive radio signals from it direct (S=I2 and R=I3). Information from the first data field is checked in the receiver N2 to see whether it was originally created by N2 itself; if so, it will be discarded. Otherwise the information will be entered in the second list in station N2 if not already contained therein and if the count CL has not already decreased below a lower limit; otherwise this information will be discarded. If the information is already contained in that second list, it will be updated if it bears a more recent time stamp. If it has already been entered with a more recent time stamp, it will be discarded.

From the second data field HB3, station N2 gets the information that station N7 can receive radio signals directly from station N6 (S=I6 and R=I7). Based on the received data field HB3, station N2 will also check its second list and, if necessary, renew it (analogously to data field HA3). Finally, as a result of the fact that station N2 has received an arbitrary packet from station N3, the first list of station N2 is updated. An entry S=I3 and R=I2 is made in the first list if this entry is not already present. The count CL, which determines the dwell time of the information, is set to a maximum value (for example 10). If the information is already contained in the first list of station N2, the count CL will only be reset to the maximum value.

The same applies analogously for station N4: If station N4 has received the data packet DAT with the data fields HA3 and HB3, then N4 will check its second list by means of the data fields HA3 and HB3 and, if necessary, supplement or renew it. Having received a data packet from station N3, station N4 will supplement or renew its first list.

By exchanging data packets with the above-described data fields (headers) in the entire radiocommunications system, it is ensured that updated lists are always available in each station.

Besides the packet DAT, FIG. 3b shows two further packets DAT' and DAT", which are transmitted by station N3 with the next packet or the next packet but one, i.e., one or two cycles later. The packet DAT' contains a first data field HA3' with the information S=I4, R=I3, CT=22, and CL=10. Accordingly, this first data field HA3' provides the information that station N3 can receive radio signals directly from station N4, and that this information was created at the system time CT=22 (one cycle later) and has not yet been routed onward (CL=10). The packet DAT' further contains a second data field HB3' with the following information: S=I4, R=I5, CT=4, and CL=2. Accordingly, the second data field provides the following information: Station N5 can receive radio signals directly from station N4. This information was created at the system time CT=4 and has already been routed onward eight times (8=10−CL).

The further packet DAT" has a first data field HA3" with the following information: S=I2, R=I3, CT=23, and CL=9. This data field HA3" differs from data field HA3 of the first data packet DAT only in that it has already been routed onward once (1=10−CL) and carries the most recent time stamp CT=23 in station N3. Accordingly, station N3 transmits the same information again two cycles later, as it already did in conjunction with the packet DAT. By this repeated transmission it is ensured that the information is also received at those stations which did not receive it before. When the count CL has reached a lowest value, this means that station N2 was no longer received by station N3 and thus has failed or is in a shadow region. The information is then discarded from the first list and thus no longer broadcast in the wireless LAN. By this mechanism, the information can be deleted from the first lists throughout the wireless LAN. After a certain time, the neighboring stations will also discard this information from the respective second lists until it is known in the entire network that this path S=I2, R=I3 can no longer be used. The packet DAT" further contains a second data field HB3" with the following information: S=I2, R=I1, CT=7, and CL=5. Thus, by transmission of this data field, the other stations are informed that station N2 can receive directly from station N1. This information has already been routed onward five times (5=10−CL=10−5). If this information is not renewed in the second list of station N3 by reception via any other station in the wireless LAN, after a few further transmissions, it will be deleted from the second list of station N3 as soon as the count CL, after being decremented on each transmission, has reached a lower limit. By this mechanism, the paths in the second lists can be deleted throughout the wireless LAN if communication is no longer possible.

In the radiocommunications system described above, all stations have the information necessary to route radio signals onward in arbitrary receiving situations. This information is continuously updated. The radiocommunications system is especially suited for use as a decentralized mobile radio system, such as a military radio system, for cordless office communication, or for wireless computer networking (wirelss LAN). The radiocommunications system need not necessarily make available several channel pairs but may also be a single-frequency system. In the above example, the information to be exchanged is transmitted together with the user data. It is also possible to transmit information separately from the user data, for example over a separate signaling channel. While the above embodiment is directed to a digital packet-radio system, it is to be understood that the invention is also applicable to analog radio transmission.

What is claimed is:

1. A decentralized radiocommunication system comprising a number of radio stations (N1 to N7), each radio station (N3) having at least one neighboring radio station (N2; N4) with which it is in direct radio communication, characterized in that all radio stations (N1 to N7) transmit radio signals with respective identifications assigned to them, and that each radio station (N3) includes a memory which holds a first list (LA3) with identifications (I2, I4) which said radio station (N3) receives directly from the at least one neighboring radio station (N2; N4), and a second list (LB3) with identifications (I3, I1; I3, I5), which the at least one neighboring radio station (N2; N4) receives directly, from radio stations (N3; N1; N3, N5) neighboring said at least one neighboring radio station (N2; N4), and routes to said radio station (N3) and also identifications (I2, I4, I5, I6, I7) which other radio stations (N1, N5, N6, N7) receive, and route via the at least one neighboring radio station (N2; N4) to said radio station (N3).

2. A decentralized radiocommunications system as claimed in claim 1, characterized in that when routing directly received identifications (I3, I5) onward, each radio station (N4) adds its own identification (I4), whereby the second list (LB3) indicates for each of the radio stations (N4) which identifications (I3, I5) it has received.

3. A decentralized radiocommunications system as claimed in claim 1, characterized in that when routing directly received identifications (I3, I1) onward, each radio station (N4) adds a time stamp (CT).

4. A decentralized radiocommunications system as claimed in claim 1, characterized in that each radio station (N4) routes directly received identifications (I3, I1) and identifications received from other radio stations to neighboring radio stations (N3, N5), and that when routing each identification onward, each radio station (N4) adds a count (CL) which indicates how often said identification has already been routed onward.

5. A decentralized radio communications system as claimed in claim 1, characterized in that the radiocommunications system is a digital radiocommunications system in which each radio station (N1 to N7) transmits radio signals, and that each radio signal is assigned a first data field (HA3), which contains a received identification (I2) from the first list (LA3), and a second data field (HB3), which contains a received identification (I1) from the second list (LB3).

6. A decentralized radiocommunications system as claimed in claim 5, characterized in that each radio signal contains data packets (DAT) to which data fields (HA3, HB3) are assigned, that the first data field (HA3) contains an identification (I3) of a radio station (N3) which transmits a data packet (DAT), and that the second data field (HB3) contains an identification (I7) of a radio station (N7) which is to receive the data packet (DAT).

7. A decentralized radiocommunications system as claimed in claim 1, characterized in that the radiocommunications system comprises mobile radio stations (N1 to N7), and that the first list and the second list stored in the memory of each mobile radio station (N3) are renewed if a receiving situation changes for at least one of the radio stations.

8. A decentralized radiocommunications system as claimed in claim 7, characterized in that, if a new radio link is added, the first list is supplemented in radio stations which receive on said new radio link directly, and that by onward routing of identifications, the second list is supplemented in radio stations which cannot receive directly on the newly added radio link.

9. A decentralized radiocommunications system as claimed in claim 7, characterized in that a radio link which can no longer be used is deleted from the first list in radio stations which could receive on said radio link directly, and from the second list in those radio stations which could not receive on said radio link directly.

10. A radio station for a decentralized radiocommunication system comprising a number of radio stations (N1 to N7), wherein each radio station (N3) having at least one neighboring radio station (N2; N4) in direct radio communication therewith, characterized in that the radio station (N3) transmits radio signals with an identification (I3) assigned to it, and includes a memory which holds a first list (LA3) with identifications (I2, I4) which said radio station (N3) receives directly from the at least one neighboring radio station (N2; N4), and a second list (LB3) with identifications (I3, I1; I3, I5), which the at least one neighboring radio station (N2; N4) receives directly, from radio stations (N3; N1; N3, N5) neighboring said at least one neighboring radio station (N2; N4), and routes to said radio station (N3), and also identifications (I2, I4, I5, I6, I7) which other radio stations (N2, N5, N6, N7) receive, and route, via the at least one neighboring radio station (N2; N4), to said radio station (N3).

* * * * *